(12) United States Patent
Kachare et al.

(10) Patent No.: US 12,124,727 B2
(45) Date of Patent: Oct. 22, 2024

(54) AUTOMATIC DELETION IN A PERSISTENT STORAGE DEVICE (71) Applicant: Samsung Electronics Co., Ltd., Suwon-si (KR)

(72) Inventors: Ramdas P. Kachare, Pleasanton, CA (US); Dongwan Zhao, San Jose, CA (US)

(73) Assignee: Samsung Electronics Co., Ltd., Yongin-si (KR)

( * ) Notice: Subject to any disclaimer, the term of this patent is extended or adjusted under 35 U.S.C. 154(b) by 0 days.

(21) Appl. No.: 17/583,022

(22) Filed: Jan. 24, 2022

(65) Prior Publication Data

US 2023/0195351 A1 Jun. 22, 2023

Related U.S. Application Data (60) Provisional application No. 63/291,075, filed on Dec. 17, 2021.

(51) Int. Cl.
*G06F 3/06* (2006.01)
(52) U.S. Cl.
CPC .......... *G06F 3/0652* (2013.01); *G06F 3/0608* (2013.01); *G06F 3/0679* (2013.01)
(58) Field of Classification Search
None
See application file for complete search history.

(56) References Cited

U.S. PATENT DOCUMENTS

| | | | | |
|---|---|---|---|---|
| 6,321,238 B1* | 11/2001 | Putzolu | ................... | G06F 16/27 |
| 6,341,340 B1* | 1/2002 | Tsukerman | ............. | G06F 16/27 |
| | | | | 707/E17.007 |
| 7,325,052 B1* | 1/2008 | Motoyama | ............ | G06F 21/554 |
| | | | | 358/1.14 |
| 7,610,437 B2* | 10/2009 | Sinclair | ................. | G06F 3/0652 |
| | | | | 711/104 |
| 7,984,084 B2* | 7/2011 | Sinclair | ............... | G06F 16/1847 |
| | | | | 707/818 |

(Continued)

FOREIGN PATENT DOCUMENTS

| | | | | |
|---|---|---|---|---|
| KR | 20200067035 A | * | 6/2020 | |
| WO | WO 2021/035555 A1 | | 3/2021 | |

OTHER PUBLICATIONS

Anonymous, "logical block addressing (LBA)", Apr. 2005, pp. 1-2, https://www.techtarget.com/whatis/definition/logical-block-addressing-LBA (Year: 2005).*

(Continued)

*Primary Examiner* — Christopher D Birkhimer
(74) *Attorney, Agent, or Firm* — Lewis Roca Rothgerber Christie LLP (57) ABSTRACT

A system and method for automatic deletion in a persistent storage device. In some embodiments, the method includes: receiving, by a persistent storage device, a first read command, for a first logical block of data; determining that a total number of read operations, for the first logical block of data, equals or exceeds a first threshold value; and in response to determining that the total number of read operations, for the first logical block of data, equals or exceeds the first threshold value, arranging for deletion of the first logical block of data from the persistent storage device.

17 Claims, 6 Drawing Sheets

(56) References Cited

U.S. PATENT DOCUMENTS

| | | | | |
|---|---|---|---|---|
| 8,285,918 B2* | 10/2012 | Maheshwari | | G11C 7/1072 |
| | | | | 711/159 |
| 8,443,263 B2* | 5/2013 | Selinger | | G06F 11/1068 |
| | | | | 714/768 |
| 8,593,748 B1* | 11/2013 | Bandic | | G11B 5/09 |
| | | | | 360/48 |
| 8,732,403 B1* | 5/2014 | Nayak | | G06F 3/0619 |
| | | | | 711/170 |
| 8,842,326 B2* | 9/2014 | Fukushima | | H04N 1/2104 |
| | | | | 358/1.14 |
| 8,873,284 B2* | 10/2014 | Sinclair | | G06F 12/0246 |
| | | | | 365/185.11 |
| 8,909,942 B1* | 12/2014 | Obukhov | | G06F 12/1408 |
| | | | | 257/659 |
| 9,111,621 B2* | 8/2015 | Krutzik | | G11C 16/22 |
| 9,223,693 B2* | 12/2015 | Sinclair | | G06F 12/0246 |
| 9,336,133 B2* | 5/2016 | Sinclair | | G06F 12/0246 |
| 9,348,746 B2* | 5/2016 | Sinclair | | G06F 12/0246 |
| 9,465,731 B2* | 10/2016 | Sinclair | | G06F 12/0246 |
| 9,715,434 B1* | 7/2017 | Xu | | G06F 3/067 |
| 9,734,050 B2* | 8/2017 | Sinclair | | G06F 12/0253 |
| 9,734,911 B2* | 8/2017 | Sinclair | | G06F 3/0658 |
| 9,778,855 B2* | 10/2017 | Sinclair | | G06F 3/064 |
| 9,857,983 B2 | 1/2018 | Lin et al. | | |
| 10,108,543 B1* | 10/2018 | Duggal | | G06F 3/0619 |
| 10,108,544 B1* | 10/2018 | Duggal | | G06F 16/1748 |
| 10,120,613 B2* | 11/2018 | Sinclair | | G06F 12/02 |
| 10,133,490 B2* | 11/2018 | Sinclair | | G06F 3/0655 |
| 10,255,179 B2* | 4/2019 | Ji | | G06F 3/0659 |
| 10,303,397 B1* | 5/2019 | Baryudin | | G06F 3/0613 |
| 10,353,612 B2 | 7/2019 | Kanno | | |
| 10,387,340 B1* | 8/2019 | Baryudin | | G06F 3/0616 |
| 10,430,279 B1* | 10/2019 | Dittia | | G06F 3/0656 |
| 10,459,839 B1 | 10/2019 | Pletka et al. | | |
| 10,664,165 B1* | 5/2020 | Faibish | | G06F 3/0638 |
| 10,795,812 B1* | 10/2020 | Duggal | | G06F 3/067 |
| 10,936,203 B2 | 3/2021 | Sunata et al. | | |
| 10,983,715 B2* | 4/2021 | Sharoni | | G06Q 20/105 |
| 11,036,628 B2 | 6/2021 | Hashimoto | | |
| 11,048,624 B2 | 6/2021 | Fischer et al. | | |
| 11,086,537 B2* | 8/2021 | Byun | | G06F 3/0679 |
| 11,188,456 B2 | 11/2021 | Navon et al. | | |
| 2001/0025340 A1* | 9/2001 | Marchant | | G06F 21/6272 |
| | | | | 713/150 |
| 2006/0004957 A1* | 1/2006 | Hand, III | | G06F 12/0866 |
| | | | | 711/E12.019 |
| 2006/0005074 A1* | 1/2006 | Yanai | | H04L 67/1095 |
| | | | | 714/6.32 |
| 2007/0033325 A1* | 2/2007 | Sinclair | | G06F 3/0608 |
| | | | | 711/170 |
| 2008/0082596 A1* | 4/2008 | Gorobets | | G06F 12/0253 |
| 2008/0144079 A1* | 6/2008 | Pandey | | H03M 7/30 |
| | | | | 358/1.15 |
| 2008/0189477 A1* | 8/2008 | Asano | | G06F 12/0246 |
| | | | | 711/E12.008 |
| 2009/0043831 A1* | 2/2009 | Antonopoulos | | G06F 3/0614 |
| 2009/0172267 A1* | 7/2009 | Oribe | | G11C 16/3418 |
| | | | | 711/E12.008 |
| 2009/0177895 A1* | 7/2009 | Murayama | | G06F 21/6236 |
| | | | | 711/E12.001 |
| 2009/0220088 A1* | 9/2009 | Lu | | G06F 21/554 |
| | | | | 713/189 |
| 2009/0276588 A1* | 11/2009 | Murase | | G06F 3/0647 |
| | | | | 711/E12.071 |
| 2010/0077013 A1* | 3/2010 | Clements | | G06F 16/1748 |
| | | | | 707/822 |
| 2010/0088296 A1* | 4/2010 | Periyagaram | | G06F 16/183 |
| | | | | 707/E17.014 |
| 2010/0125553 A1* | 5/2010 | Huang | | G06F 11/1453 |
| | | | | 707/661 |
| 2010/0174881 A1* | 7/2010 | Anglin | | G06F 11/1453 |
| | | | | 711/E12.103 |
| 2010/0281081 A1* | 11/2010 | Stager | | G06F 9/5022 |
| | | | | 707/814 |
| 2010/0333116 A1* | 12/2010 | Prahlad | | G06F 16/1844 |
| | | | | 713/153 |
| 2011/0145473 A1* | 6/2011 | Maheshwari | | G06F 12/12 |
| | | | | 711/E12.008 |
| 2011/0161784 A1* | 6/2011 | Selinger | | G06F 11/1016 |
| | | | | 714/E11.002 |
| 2013/0166855 A1* | 6/2013 | Batwara | | G06F 12/0802 |
| | | | | 711/154 |
| 2014/0006688 A1* | 1/2014 | Yu | | G06F 12/0246 |
| | | | | 365/185.03 |
| 2014/0059279 A1 | 2/2014 | He et al. | | |
| 2014/0153034 A1* | 6/2014 | Fukushima | | H04N 1/21 |
| | | | | 358/1.14 |
| 2014/0325148 A1* | 10/2014 | Choi | | G06F 3/0659 |
| | | | | 711/114 |
| 2014/0365719 A1* | 12/2014 | Kuzmin | | G06F 12/0246 |
| | | | | 711/103 |
| 2015/0205816 A1* | 7/2015 | Periyagaram | | G06F 11/1453 |
| | | | | 707/827 |
| 2015/0222705 A1 | 8/2015 | Stephens | | |
| 2015/0227602 A1* | 8/2015 | Ramu | | G06F 11/1456 |
| | | | | 707/634 |
| 2015/0261776 A1* | 9/2015 | Attarde | | G06F 16/1748 |
| | | | | 707/664 |
| 2015/0339188 A1* | 11/2015 | Hu | | G06F 11/3034 |
| | | | | 714/704 |
| 2016/0246713 A1* | 8/2016 | Choi | | G06F 3/0608 |
| 2016/0350324 A1* | 12/2016 | Wang | | G06F 16/137 |
| 2017/0038978 A1* | 2/2017 | Li | | G06F 3/0611 |
| 2017/0123655 A1* | 5/2017 | Sinclair | | G06F 3/061 |
| 2018/0189175 A1* | 7/2018 | Ji | | G06F 3/0679 |
| 2018/0314727 A1* | 11/2018 | Epstein | | G06N 5/01 |
| 2020/0089420 A1* | 3/2020 | Sharoni | | G06Q 20/354 |
| 2020/0174921 A1 | 6/2020 | Lee | | |
| 2020/0192794 A1* | 6/2020 | Lee | | G06F 3/0607 |
| 2020/0310686 A1* | 10/2020 | Truong | | G06F 3/061 |
| 2020/0333982 A1* | 10/2020 | Lee | | G06F 3/0619 |
| 2020/0409562 A1* | 12/2020 | Navon | | G06F 12/0253 |
| 2021/0064287 A1 | 3/2021 | Kanno | | |
| 2021/0081127 A1* | 3/2021 | Xiao | | G06F 3/064 |
| 2021/0117132 A1* | 4/2021 | Vankamamidi | | G06F 3/0688 |
| 2021/0124502 A1 | 4/2021 | Elyasi et al. | | |
| 2021/0191640 A1* | 6/2021 | Ponnala | | G06F 3/0641 |
| 2021/0225452 A1* | 7/2021 | Yoon | | G11C 16/0483 |
| 2021/0263821 A1* | 8/2021 | Yang | | G11C 29/021 |
| 2021/0374021 A1* | 12/2021 | Santhakumar | | G06F 11/3485 |

OTHER PUBLICATIONS

Microsoft, "Computer Dictionary", Fifth Edition, 2002, p. 317 (Year: 2002).*

Wikipedia, "Logical block addressing", Dec. 2020, pp. 1-5, https://en.wikipedia.org/w/index.php?title=Logical_block_addressing&oldid=994331772 (Year: 2020).*

CitizenChoise, "Logical addressing", 2020, pp. 1-2, https://citizenchoice.in/course/computer-networks-theory/Chapter%203/4-logical-addressing (Year: 2020).*

Michael McCool et al., "Structured Parallel Programming", Chapter 2—Background, 2012, pp. 47-48, https://www.sciencedirect.com/science/article/pii/B9780124159938000025 (Year: 2012).*

EPO Extended European Search Report dated May 23, 2023, issued in European Patent Application No. 22212234.3 (9 pages).

* cited by examiner

| Extracted from NVMe command | | | Filled by FTL | |
| --- | --- | --- | --- | --- |
| Logical Address (LBA) | Expected number of reads | Valid | Physical Address (PBA) | Current Read Counter |
| 0000 | 1 | Y | Die 0, Block 1, Address 0x0001_0000 | 0 |
| 0010 | 10 | N | Die 1, Block 1, Address 0x0011_0004 | 10 |
| 1005 | 100 | Y | Die 1, Block 5, Address 0x0015_0330 | 20 |
| 1206 | 0 (infinite) | Y | Die 0, Block 6, Address 0x0006_0470 | 10 |

AUTOMATIC DELETION IN A PERSISTENT STORAGE DEVICE

CROSS-REFERENCE TO RELATED APPLICATION(S)

The present application claims priority to and the benefit of U.S. Provisional Application No. 63/291,075, filed Dec. 17, 2021, entitled "AUTO DELETE AFTER READING SSD", the entire content of which is incorporated herein by reference.

FIELD

One or more aspects of embodiments according to the present disclosure relate to persistent storage, and more particularly to a system and method for automatically deleting data from a persistent storage device.

BACKGROUND

Persistent storage devices may provide long-term data storage in various applications. In such a situation, a host may send data to a persistent storage device for storage, and later read the data from the persistent storage device as needed.

It is with respect to this general technical environment that aspects of the present disclosure are related.

SUMMARY

Some embodiments provide a Solid State Drive (SSD) architecture for auto-deleting a logical block when the number of read operations performed on the logical block reaches a predefined, host-specified limit or "threshold value". The host may specify, e.g., with a write command, the expected number of reads for the data being written; once the limit has been reached, the persistent storage device may immediately invalidate the data (making it a candidate for deletion in a garbage collection operation). Such an embodiment may enable efficient garbage collection operations by reducing unnecessary data movement and thereby leave available more bandwidth for host input-output access.

According to an embodiment of the present disclosure, there is provided a method including: receiving, by a persistent storage device, a first read command, for a first logical block of data; determining that a total number of read operations, for the first logical block of data, equals or exceeds a first threshold value; and in response to determining that the total number of read operations, for the first logical block of data, equals or exceeds the first threshold value, arranging for deletion of the first logical block of data from the persistent storage device.

In some embodiments, the arranging for deletion of the first logical block of data includes marking the first logical block of data as invalid.

In some embodiments, the arranging for deletion of the first logical block of data further includes deleting a physical block of data as part of a garbage collection operation, the physical block of data including a portion of the first logical block of data.

In some embodiments, the method further includes receiving a first write command, for the first logical block of data, the first write command including the first threshold value.

In some embodiments: the persistent storage device includes flash memory and a logical to physical address mapping table; and the method further includes storing the first threshold value in a row of the logical to physical address mapping table, the row corresponding to the first logical block of data.

In some embodiments, the method further includes: receiving, by the persistent storage device, a second read command, for a second logical block of data; and in response to receiving the second read command, incrementing a read counter in a row of the logical to physical address mapping table, the row corresponding to the second logical block of data.

In some embodiments, the method further includes: receiving a second write command, for the second logical block of data, the second write command including a second threshold value; determining that the second threshold value and the first threshold value meet a criterion of similarity; and in response to determining that the second threshold value and the first threshold value meet the criterion of similarity, storing a portion of the second logical block of data and a portion of the first logical block of data in a first physical block.

In some embodiments, the method further includes: determining, for a first physical block of the persistent storage device, that a set of remaining read times meets a criterion for few remaining read times, and in response to determining that the set of remaining read times meets the criterion for few remaining read times, performing garbage collection in the first physical block.

In some embodiments, the method further includes: receiving a query regarding support for an auto-delete feature, and responding to the query with a response indicating that the auto-delete feature is supported.

In some embodiments, the method further includes: receiving a query regarding auto-deleted logical blocks of data, and responding to the query with a response including a list of logical blocks of data, the list including the first logical block of data.

In some embodiments, the method further includes: persistent storage media; and a processing circuit, the processing circuit being configured to: receive a first read command, for a first logical block of data; determine that a total number of read operations, for the first logical block of data, equals or exceeds a first threshold value; and in response to determining that the total number of read operations, for the first logical block of data, equals or exceeds the first threshold value, arrange for deletion of the first logical block of data from the persistent storage device.

In some embodiments, the arranging for deletion of the first logical block of data includes marking the first logical block of data as invalid.

In some embodiments, the arranging for deletion of the first logical block of data further includes deleting a physical block of data as part of a garbage collection operation, the physical block of data including a portion of the first logical block of data.

In some embodiments, the processing circuit is further configured to receive a first write command, for the first logical block of data, the first write command including the first threshold value.

In some embodiments: the persistent storage device includes flash memory and a logical to physical address mapping table; and the processing circuit is further configured to store the first threshold value in a row of the logical to physical address mapping table, the row corresponding to the first logical block of data.

In some embodiments, the processing circuit is further configured to: receive a second read command, for a second logical block of data; and in response to receiving the second read command, increment a read counter in a row of the logical to physical address mapping table, the row corresponding to the second logical block of data.

In some embodiments, the processing circuit is further configured to: receive a second write command, for the second logical block of data, the second write command including a second threshold value; determine that the second threshold value and the first threshold value meet a criterion of similarity; and in response to determining that the second threshold value and the first threshold value meet the criterion of similarity, store a portion of the second logical block of data and a portion of the first logical block of data in a first physical block.

In some embodiments, the processing circuit is further configured to: determine, for a first physical block of the persistent storage device, that a set of remaining read times meets a criterion for few remaining read times, and in response to determining that the set of remaining read times meets the criterion for few remaining read times, perform garbage collection in the first physical block.

In some embodiments, the processing circuit is further configured to: receive a query regarding support for an auto-delete feature, and respond to the query with a response indicating that the auto-delete feature is supported.

According to an embodiment of the present disclosure, there is provided a persistent storage device, including: persistent storage media; and means for processing, the means for processing being configured to: receive a first read command, for a first logical block of data; determine that a total number of read operations, for the first logical block of data, equals or exceeds a first threshold value; and in response to determining that the total number of read operations, for the first logical block of data, equals or exceeds the first threshold value, arrange for deletion of the first logical block of data from the persistent storage device.

BRIEF DESCRIPTION OF THE DRAWINGS

These and other features and advantages of the present disclosure will be appreciated and understood with reference to the specification, claims, and appended drawings wherein:

DETAILED DESCRIPTION

The detailed description set forth below in connection with the appended drawings is intended as a description of exemplary embodiments of a system and method for automatic deletion in a persistent storage device provided in accordance with the present disclosure and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the scope of the disclosure. As denoted elsewhere herein, like element numbers are intended to indicate like elements or features.

The performance of a persistent storage device (e.g., a solid state drive (SSD)) may begin to decline when the amount of data stored in the persistent storage device exceeds, a given percentage (e.g., about 50%) of the capacity of the persistent storage device. For example, in the case of an SSD, the data bandwidth to the flash memory consumed by background operations such as garbage collection may become large when the SSD is almost full. When the SSD is nearly full, the read and write input-output operations per second (IOPS) may be significantly reduced, even if most of the stored data is data no longer needed by the host. This may impact the performance of the SSD as well as the endurance of the flash media. A persistent storage device may not natively be aware of which blocks of data are invalid and available for replacement, unless explicitly informed by the host for which the data are stored. Not deleting or archiving such data, may, in an SSD, result in unnecessary flash data movement and redundant garbage collection operations, and may slow down the host data accesses.

Some applications (e.g., applications running on the host) may have a type of workload characteristic in which data is written to persistent storage by the host, and subsequently, after the data is longer needed, deleted from the persistent storage device. In some circumstances, the delay between the time at which the data is no longer needed and the time at which the host deletes the data from the persistent storage device may be significant, potentially resulting in a degradation of the performance of the persistent storage device. In some circumstances, an application may be aware, at the time of writing data to an SSD, of an "expected number of reads" for the data, i.e., the number of times data will be read after having been written. For example, certain messages exchanged by social media users may be deleted after having been viewed once, and certain sensor data may be discarded once the data has been read and processed. For some group messages or social media posts, once a message is read by everyone inside the group, the message may be deleted or marked as inactive (and, e.g., moved to storage designated for infrequently accessed data). In such circumstances, the performance of a persistent storage device may be improved, e.g., by arranging for automatic deletion of stored data after a certain number of read operations have been performed on the data.

Some embodiments provide a storage device (e.g., SSD) architecture for auto-deleting a logical block when the number of read operations performed on the logical block reaches a predefined, host-specified limit or "threshold value" (e.g., the expected number of reads). Once the threshold value has been reached, the persistent storage device may immediately invalidate the data (making it a candidate for deletion in a garbage collection operation). The persistent storage device may further keep track of its dynamic storage capacity and real-time available capacity may be queried by the host.

Further, the persistent storage device may preferentially perform garbage collection in physical blocks with fewer remaining read times. In some embodiments, the persistent storage device may store data with few expected reads together in a physical block, thereby reducing the likelihood that copying of the data to a new block to avoid read disturb errors will be needed, or avoiding the need for such copying entirely.

Figure 1:
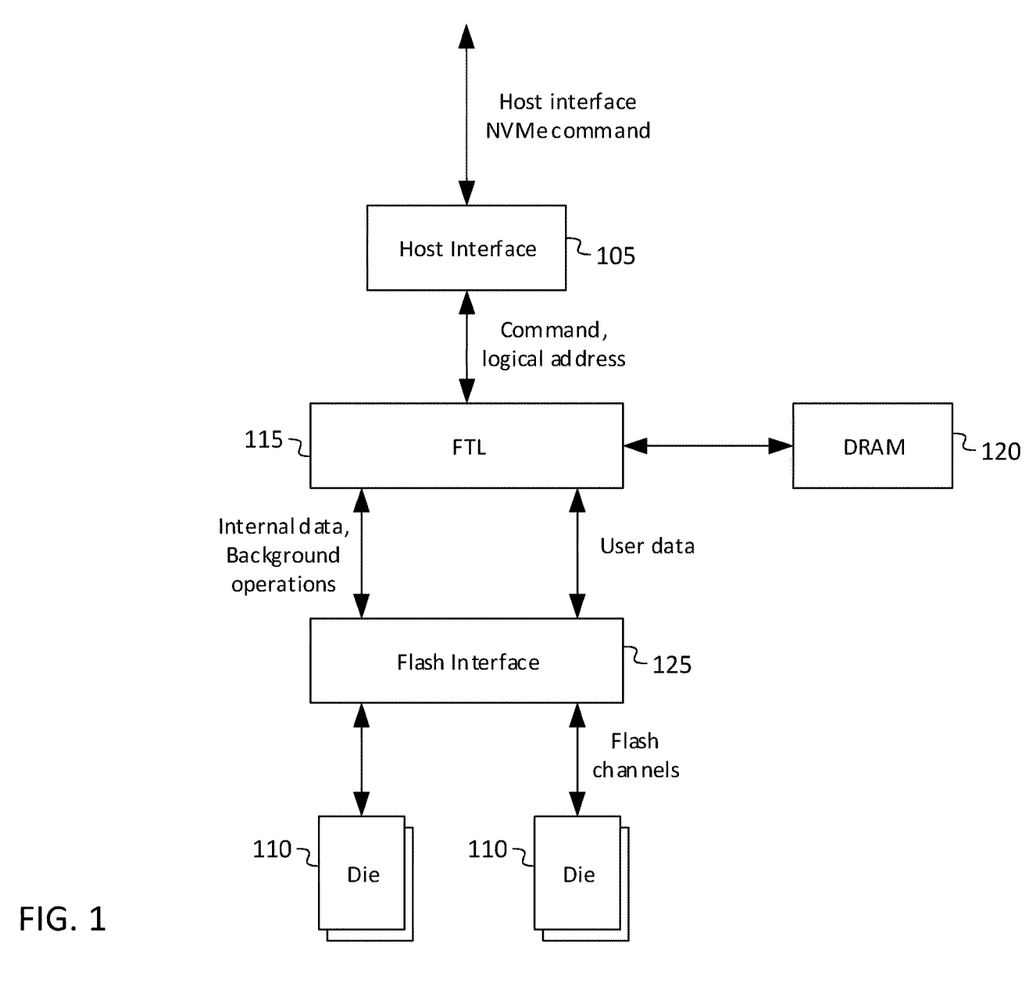
FIG. 1 is a block diagram of a solid state drive, according to an embodiment of the present disclosure.

FIG. 1 is a block diagram of an SSD, in some embodiments. The host interface 105 is used by the host, or "Storage Server host", to communicate with the SSD. The data write and read IO commands, as well as various media management commands such as the nonvolatile memory express (NVMe) Identify command and the NVMe Get Log command may be received, by the SSD, through the host interface 105. The host interface 105 may also be used by the SSD to perform data transfers to and from host system memory. The SSD may store data in not-AND (NAND) flash memory 110, e.g., in memory dies containing memory cells, each of which may be, e.g., a Single-Level Cell (SLC), a Multi-Level Cell (MLC), or a Triple-Level Cell (TLC). A Flash Translation Layer (FTL) 115 may provide a mapping between logical addresses used by the host and physical addresses of the data in the flash memory. The SSD may also include (i) a buffer 120 (which may include, e.g., consist of, dynamic random-access memory (DRAM), and (ii) a flash interface (or "flash controller") 125 for providing suitable signals to the flash memory 110. Some or all of the host interface 105, the FTL 115, the buffer 120, and the flash interface 125 may be implemented in a processing circuit, which may be referred to as the SSD controller.

The NAND flash memory may be read or written at the granularity of a flash page, which may be between 8 kB and 16 kB in size. Before the flash memory page can be reprogrammed with new data, it may first be erased. The granularity of an erase operation may be one NAND block, or "physical block", which may include, e.g. between 128 and 256 pages. Because the granularity of erase and program operations are different, garbage collection (GC) may be used to free up partially invalid physical blocks and to make room for new data. The garbage collection operation may (i) identify fragmented flash blocks, in which a large proportion (e.g., most) of the pages are invalid, and (ii) erase each such physical block. When garbage collection is completed, the pages in an erased physical block may be recycled and added to a free list in the FTL.

Flash memory can be programmed and erased only a limited number of times. This may be referred to as the maximum number of program/erase cycles (P/E cycles) it can sustain. To maximize the life of the SSD, the SSD controller may endeavor to distribute write operations across all of the physical blocks of the flash memory 110; this process may be referred to as wear-leveling.

A mechanism that may be referred to as "read disturb" may reduce SSD reliability. A read operation on a NAND flash memory cell may cause the threshold voltage of nearby unread flash cells in the same physical block to change. Such disturbances may change the logical states of the unread cells, and may lead to uncorrectable error-correcting code (ECC) read errors, degrading flash endurance. To avoid this result, the FTL may have a counter of the total number of reads to a physical block since the last erase operation. The contents of the physical block may be copied to a new physical block, and the physical block may be recycled, when the counter exceeds a threshold (e.g. 50,000 reads for MLC), to avoid irrecoverable read disturb errors. As an alternative, in some embodiments, a test read may periodically be performed within the physical block to check the ECC error rate; if the error rate is close to the ECC capability, the data may be copied to a new physical block.

Because of the relocation of data performed by various operations (e.g., garbage collection) in the SSD, the amount of data that is erased and rewritten may be larger than the data written to the SSD by the host. Each time data are relocated without being changed by the host system, a quantity referred to as "write amplification" is increased, and the life of the flash memory 110 is reduced. Write amplification may be measured as the ratio of (i) the number of writes committed to the flash memory to (ii) the number of writes coming from the host system.

The FTL may perform various background operations like garbage collection and wear-leveling. As such, host IO commands co-exist with background operations and these two types of flash access may compete with each other for flash bandwidth. The overhead associated with performing additional program/erase cycles may impact the performance of the SSD.

SSD write performance may decrease dramatically when the drive is near full capacity. As the SSD fills up, fewer empty physical blocks are available. When new write data are received during garbage collection, the SSD may read the value of an existing physical block into the buffer 120, modify the values with the new data, and then write the buffered data back to the flash memory 110. This may introduce a significant amount of additional delay.

The Data Set Management Trim command may be employed to delete (e.g., mark as invalid) data stored in the flash memory 110, so that garbage collection may then empty physical blocks in the SSD and increase the SSD's available space, so that the SSD may then write new data to the empty physical blocks. This command enables the host to inform the SSD of which blocks of previously saved data are no longer needed. The SSD may then reclaim the pages containing these blocks as free space when they are erased instead of copying the unneeded data to clean pages. If, however, the host does not use the Trim command promptly when data are no longer need, then unneeded data may be left on the SSD. This may impact FTL and IO performance.

As mentioned above, some embodiments provide an SSD architecture for auto-deleting a logical block when the number of read operations performed on the logical block reaches a predefined, host-specified limit or "threshold value". The host may specify, e.g., with a write command, the expected number of reads for the data being written; once the expected number of reads has been reached, the persistent storage device may immediately invalidate the data (making it a candidate for deletion in a garbage collection operation). This allows more capacity to be available for overprovisioning (or "over provisioning") as well as for user data. Such an embodiment may enable efficient garbage collection operations by reducing unnecessary data movement and thereby reserve more bandwidth for host IO access. Because data movement may be reduced, write amplification and read disturb related errors in the flash media may be reduced significantly. Furthermore, such an embodiment may increase the life of flash memory and improve the overall performance of the SSD. To the extent that such an embodiment increases overprovisioned space, the physical overprovisioning capacity of the SSD may be reduced to reduce the cost of the SSD, without a significant degradation in SSD performance. As used herein, a "logical block" or a "logical block of data" is a quantity of data (e.g., the quantity of data corresponding to a file or portion of a file, from the perspective of the host operating system) that the host treats as a unit. As used herein, a "physical block" is a quantity of persistent storage, e.g., a quantity of flash memory cells that are erased together when an erase operation is performed. A logical block may be smaller than a physical block and, if so, it may be stored in a single physical block, or different portions of it may be stored in different physical blocks. A logical block may also be larger than a physical block.

The SSD controller may perform data transfers between host system memory and the persistent flash memory for IO commands. The IO commands may specify the source and destination addresses and the length of the data transfer. The FTL maintains a logical to physical address mapping table and keeps a record of the physical flash location for all logical blocks of data. The SSD controller stores the expected number of reads parameter received from the host IO write command for each logical block and counts the number of reads performed on that logical block (e.g., by incrementing a read counter in the logical to physical address mapping table, in response to the receiving of each read command). The SSD controller then arranges for the deletion of the logical block, e.g., (i) it deletes the data or (ii) it invalidates the logical block in the logical to physical address mapping table once the read counter reaches a threshold number (e.g., the expected number of reads). Like logical blocks that are invalidated as a result of delete (e.g., Trim) commands or overwrite commands received from the host, logical blocks that are invalidated by the SSD controller as a result of the read counter having reached the expected number of reads may be erased during garbage collection (instead of moving them to a clean physical block). The freed user space is available for garbage collection and user data. If, from the perspective of the host, certain logical blocks should be treated as a unit (e.g., a plurality of logical blocks corresponding to a file), then the host may specify the same expected number of reads for each of the logical blocks, so that if they are all accessed as a unit during subsequent read operations, they may all be marked as invalid at the same time.

The expected number of reads parameter, received by the SSD on a per command basis, may also help the SSD controller (e.g., the FTL) to identify target physical blocks for which to perform garbage collection. For example, the FTL may count the total number of remaining read times of a certain physical block and select the target physical block based on this count. As used herein, a "remaining read time" for a logical block is the expected number of reads for the logical block less the value of the read counter for the logical block. For example, a physical block with higher remaining read times may have a higher chance to be read shortly. Accordingly, the FTL may determine that a candidate target physical block meets a criterion for few remaining read times, and, in response to determining that the set of remaining read times meets a criterion for few remaining read times, perform garbage collection in the physical block. The criterion for few remaining read times may be any criterion that is satisfied, for any given physical block, for a first number of remaining read times and not satisfied for a second number of remaining read times, the first number of remaining read times being less than the second number of remaining read times. For example the criterion may be met if the number of remaining read times is less than a set threshold value, or less than a threshold value that depends on the number of invalid pages in the physical block (e.g., the threshold value being greater the greater the number of invalid pages in the physical block). For example, if two physical blocks have a similar number of invalid pages, the FTL may perform garbage collection on the one with fewer remaining read times. In some embodiments the FTL may instead perform garbage collection on the one with more remaining read times. Avoiding the copying, during garbage collection, of data no longer needed by the host, may also reduce the data read frequency, which in turn may reduce read disturb related errors in the flash media, thus improving SSD performance further.

In some embodiments, the FTL places the data according to the expected number of reads parameter, to further reduce read disturb errors. For example, the SSD may receive a first write command, for a first logical block of data, and a second write command, for a second logical block of data, the first write command including a first expected number of reads, and the second write command including a second expected number of reads. The SSD may then determine that the second expected number of reads and the first expected number of reads meet a criterion of similarity, and, in response to determining that the second expected number of reads and the first expected number of reads meet a criterion of similarity, store a portion of the second logical block of data (e.g., all of the second logical block of data) and a portion of the first logical block of data (e.g., all of the second logical block of data) in the same physical block. Similarly, when the SSD receives a write command with an expected number of reads, it may store the associated data in the same physical block as previously stored data having a remaining number of reads similar to the expected number of reads (e.g., meeting, with the expected number of reads, a similarity criterion). This strategy may make it possible to perform garbage collection less frequently, and to copy less data when garbage collection is performed, because it may cause the logical blocks of data in a given physical block to become invalidated at nearly the same time, making it feasible to wait until all or nearly all of the data in a physical block have expired before performing garbage collection.

As another example, the FTL may place data with low expected numbers of reads in one physical block so as to keep the total number of reads of that physical block below the threshold that triggers copying to avoid irrecoverable read disturb errors. In such a physical block, there may therefore be no need for copying to avoid irrecoverable read disturb errors; this may reduce the number of program-erase cycles and extend the life of the flash memory 110. Moreover, in a given block (i) if read disturb errors are avoided by limiting the total number of reads below the threshold and (ii) the data in the physical block expire around a similar time, then the block may not need additional data movement and garbage collection.

In some embodiments, the host may specify the expected number of reads at a later time, after the sending of the write command, e.g., using a NVMe Set Feature command. This specification by the host may (i) convert data with an unlimited number of reads to data that is to be erased after the expected number of reads, or (ii) override a specification, previously sent (with the write command or otherwise), for the expected number of reads. In some embodiments, the elapsed time since the data was written, or the elapsed time since the data was last read may be used in combination with the number of reads and the expected number of reads to determine whether data should be marked as invalid; for example, in some embodiments, the persistent storage device may wait, after the number of reads equals the expected number of reads, for a certain interval of time to pass (e.g., between 0.1 hours and 72.0 hours) before marking the data as invalid, thereby giving the host an opportunity to avoid deletion should circumstances change in a manner that increases the benefit of preserving the data.

In some embodiments, the host may specify, e.g., using an NVMe Set Feature command (or other, similar command language which can generate a similar result), a default or common value, for the expected number of reads, to be used for all data written to the persistent storage device (after the setting of the default value) (i) within certain LBA ranges, (ii) within a certain time interval, (ii) within a range of times of day (e.g., between 3:00 PM and 5:00 PM Pacific time), (iii) within a certain namespace, (iv) by a host with a host identifier that is in a certain list of host identifiers, or (v) otherwise matching certain conditions set on storage or network parameters.

Figure 2A:
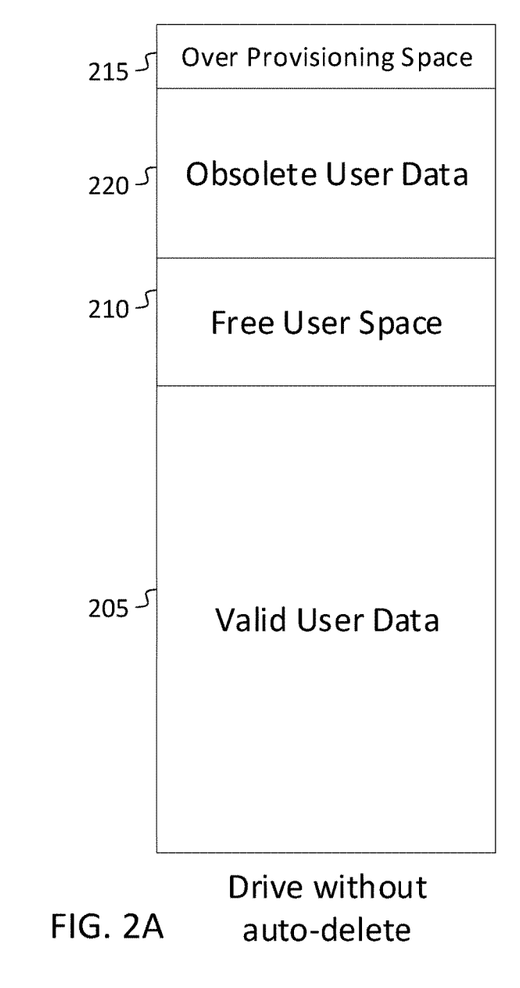
FIG. 2A is a storage space allocation diagram for a persistent storage device without an auto-delete feature.
Figure 2B:
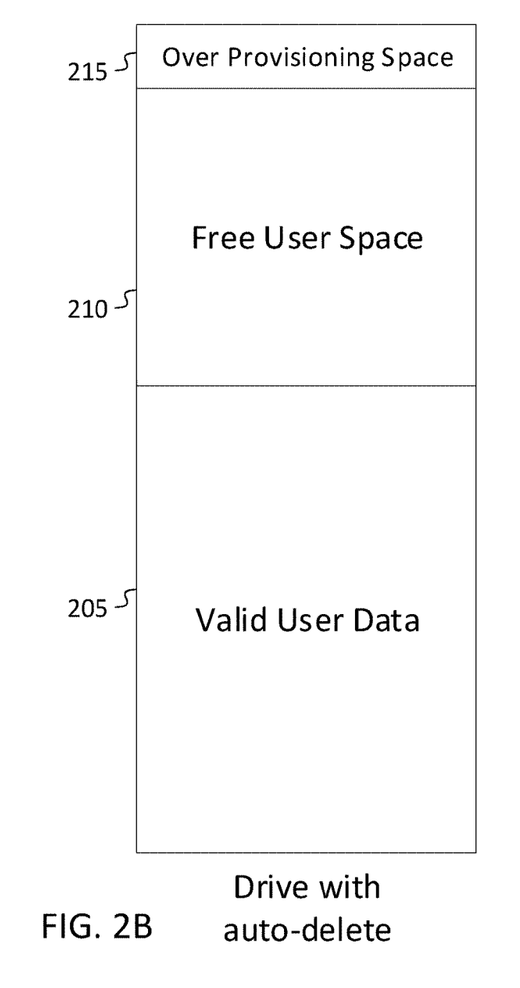
FIG. 2B is a storage space allocation diagram for a persistent storage device with an auto-delete feature, according to an embodiment of the present disclosure.

FIGS. 2A and 2B show the SSD storage space layout without (FIG. 2A) and with (FIG. 2B) an auto-delete feature as described herein. In each case some of the storage space is occupied by each of (i) valid user data 205, (ii) free user space 210, and (iii) overprovisioning space 215. In the case without an auto-delete feature, however, some of the storage space is consumed by obsolete user data 220 (data no longer needed by the host, but not yet deleted or overwritten by the host). The amount of free user space 210 is greater, as illustrated, when an auto-delete feature is used. The use of an auto-delete feature may reduce the background data traffic and reserve more resources and bandwidth for host IO operations.

Figure 2C:
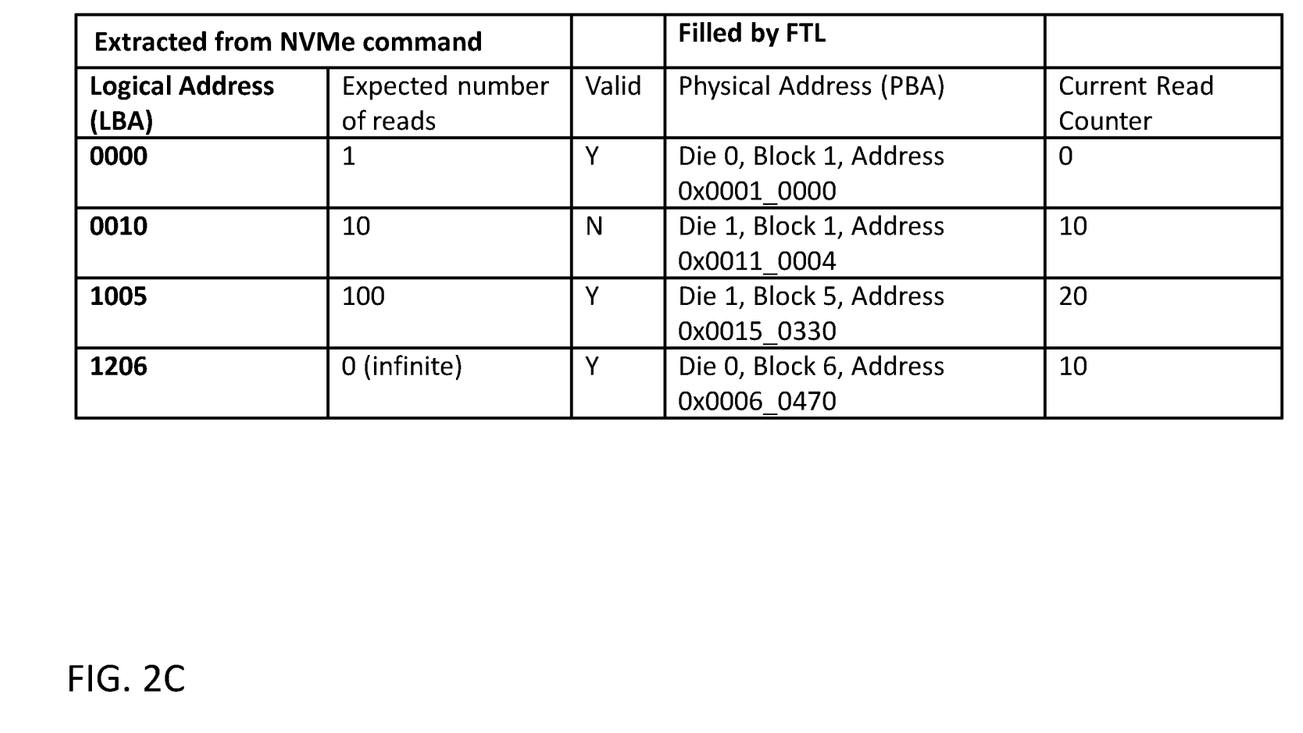
FIG. 2C is an illustration of a logical to physical address mapping table.

As mentioned above, the FTL may write the expected number of reads along with the logical and physical address to the logical to physical address mapping table before storing the data in (e.g., programming the data to) the flash memory 110. The table of FIG. 2C shows information that may be included in the logical to physical address mapping table, in some embodiments.

Figure 3:
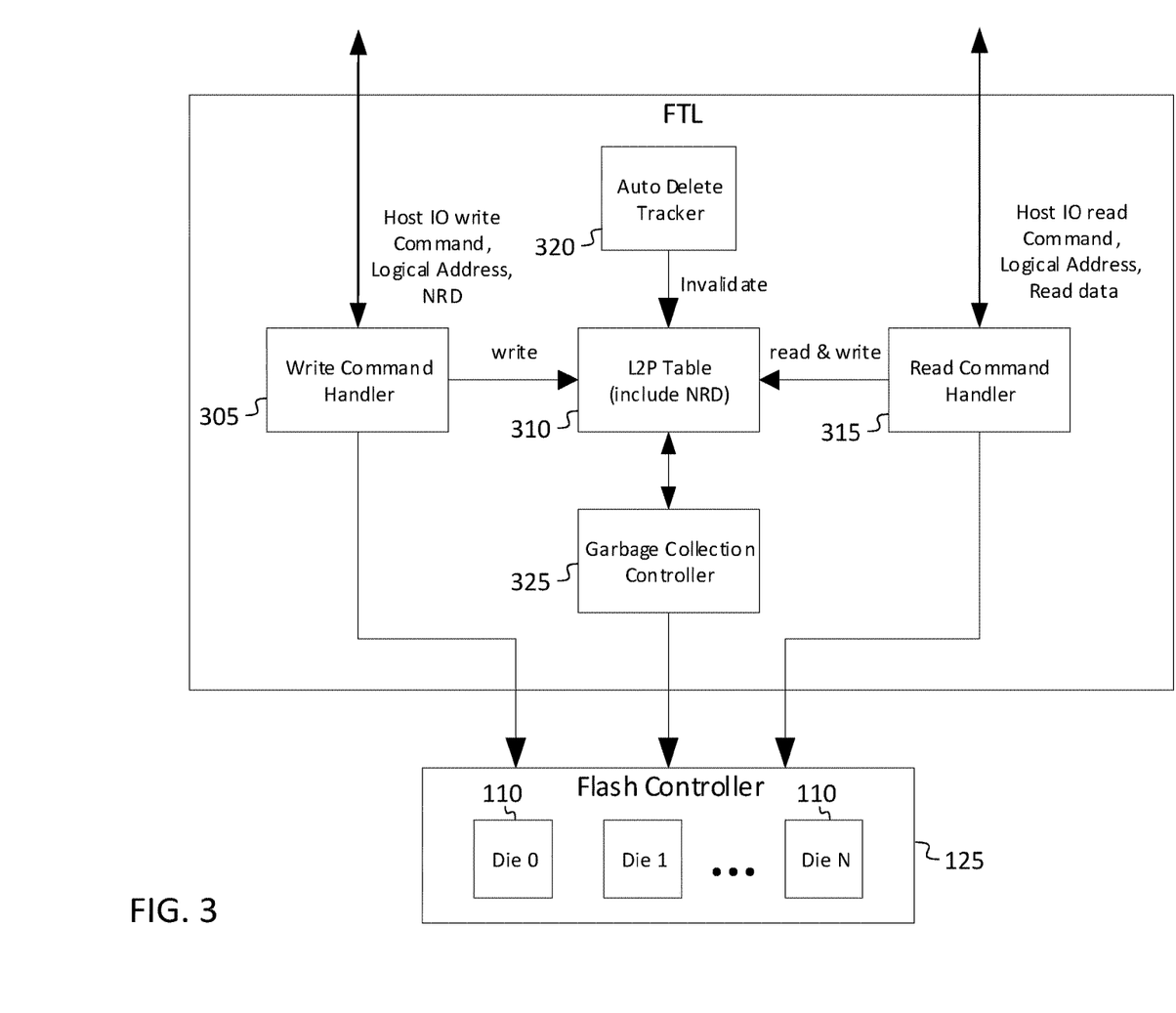
FIG. 3 is a block diagram of an architecture to support an auto-delete feature, according to an embodiment of the present disclosure.

FIG. 3 shows an example of an FTL architecture to support an auto-delete feature. When a write command is received, a write command handler 305 may allocate the physical address and write the expected number of reads (NRD) to the logical to physical address mapping table 310. A read command handler 315 may read the physical address from the logical to physical address mapping table and update the read counter of the logical blocks. The auto-delete tracker 320 may keep track of the read counter for each row of the logical to physical address mapping table. Once the read counter matches the value of the expected number of reads, the auto-delete tracker 320 logs the logical block number (in a log that the host may query (e.g., using the NVMe Get Log Page command), so that the host may determine which logical blocks have been automatically deleted) and invalidates the entry in the logical to physical address mapping table. The auto-delete tracker may also maintain statistics for the dynamic available capacity for each namespace. These statistics may be queried by the host through various NVMe commands such as the Identify command, the Get Feature command, or the Get Log command. A garbage collection controller 325 may control garbage collection.

The SSD controller may advertise support for the auto-delete feature after the host sends a command for reading features through the NVMe Identify data structure. Various pieces of information may be exposed through the Identify data structure, such as, for example (i) a field signaling support for auto delete after reading N times, or (ii) a field signaling support for reporting real-time available capacity for the namespace. If reporting real-time available capacity for the namespace is supported, the host may query the available capacity dynamically through the NVMe Identify command or the NVMe Get Feature command.

When the NVMe driver and system software reads the Identify data structure, it becomes aware that the connected SSD controller supports auto-delete after a certain number of read operations. The driver may then configure and enable (or disable) the auto-delete feature in the SSD controller using NVMe Set Feature commands. Once the auto-delete feature is enabled, the NVMe driver and system software may insert an expected number of reads into each NVMe write command. The FTL logs the logical block address (LBA) of data when data has been invalidated, or when data has been deleted. The host can access the log using the NVMe Get Log Page command.

In another embodiment, as an alternative to deleting data that has reached the expected number of reads, the data may be labeled as cold data (and, e.g., prepared for archival), or moved to a different media type, or compressed, according to the capabilities of the system and according to preferences that may be specified by the application.

Figure 4:
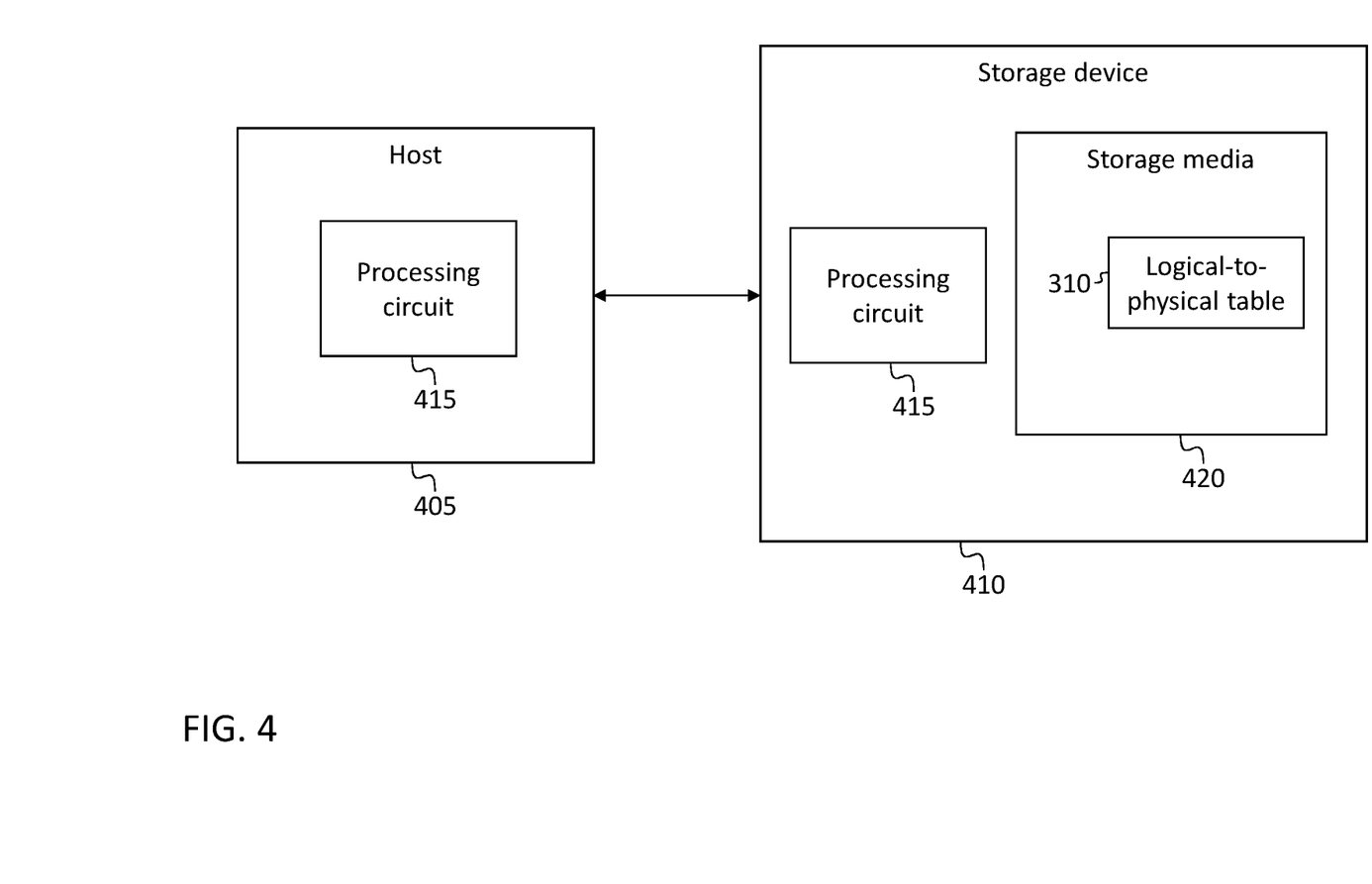
FIG. 4 is a block diagram of a persistent storage device and a host, according to an embodiment of the present disclosure.

FIG. 4 is a block diagram of a host 405 and a persistent storage device 410 (which may be an SSD). The storage device 410 may have a form factor that is any one of a plurality of form factors suitable for persistent storage devices, including but not limited to 2.5", 1.8", MO-297, MO-300, M.2, and Enterprise and Data Center SSD Form Factor (EDSFF), and it may have an electrical interface, through which it may be connected to the host 405, that is any one of a plurality of interfaces suitable for persistent storage devices, including Peripheral Component Interconnect (PCI), PCI express (PCIe), Ethernet, Small Computer System Interface (SCSI), Serial AT Attachment (SATA), and Serial Attached SCSI (SAS). Each of the host 405 and the storage device 410 may include a processing circuit 415 (discussed in further detail below). The storage device 410 may also include persistent storage media 420 (e.g., NAND flash), in which may be stored the logical to physical address mapping table (or "logical-to-physical table") 310. The processing circuit 415 of the storage device 410 may perform (and, using the processing circuit 415 that it contains, the storage device 410 may perform) some or all of the methods described herein.

Figure 5:
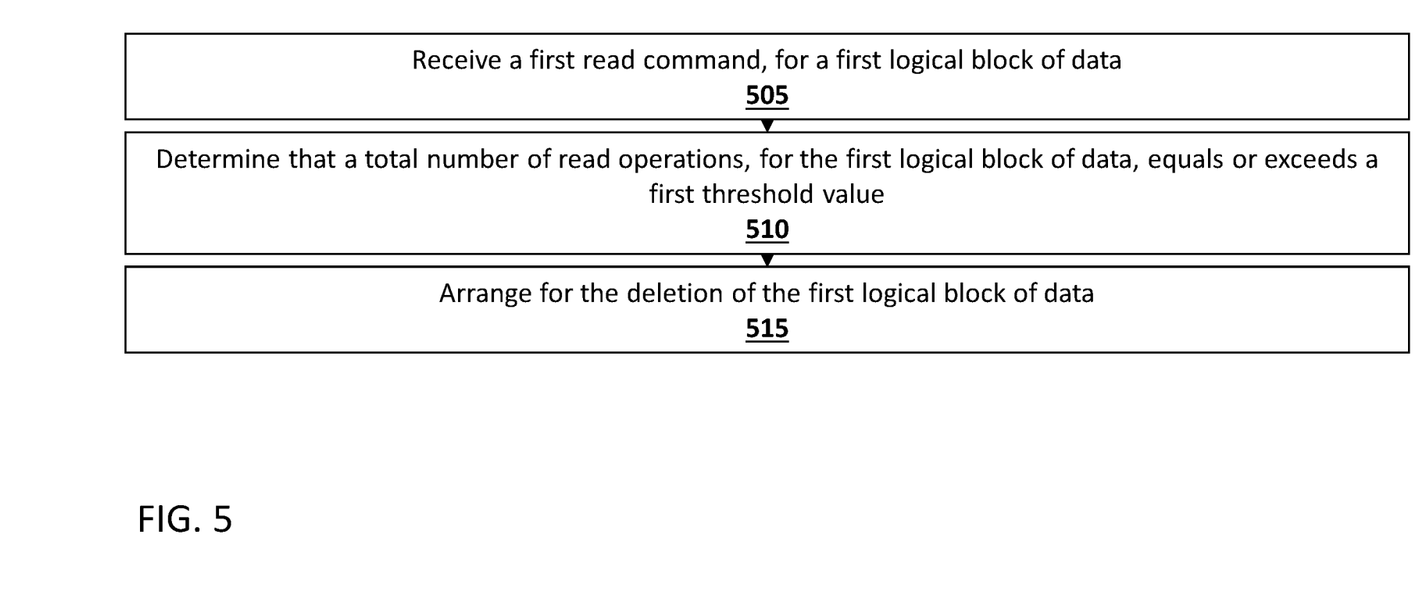
FIG. 5 is a flowchart of a method, according to an embodiment of the present disclosure.

The flowchart of FIG. 5 shows an example of a method, including receiving, at 505, by a persistent storage device, a first read command, for a first logical block of data; determining, at 510, that a total number of read operations, for the first logical block of data equals or exceeds a first threshold value (e.g., an expected number of reads); and, in response to determining that the total number of read operations, for the first logical block of data, equals or exceeds the first threshold value, arranging, at 515, for the deletion of the first logical block of data from the persistent storage device.

Although some embodiments are described herein in the context of an SSD, the present disclosure is not limited to such embodiments, and in some embodiments the methods disclosed herein, or similar methods, may be practiced with other kinds of persistent storage devices.

As used herein, "a portion of" something means "at least some of" the thing, and as such may mean less than all of, or all of, the thing. As such, "a portion of" a thing includes the entire thing as a special case, i.e., the entire thing is an example of a portion of the thing. As used herein, the term "or" should be interpreted as "and/or", such that, for example, "A or B" means any one of "A" or "B" or "A and B".

The background provided in the Background section of the present disclosure section is included only to set context, and the content of this section is not admitted to be prior art. Any of the components or any combination of the components described (e.g., in any system diagrams included herein) may be used to perform one or more of the operations of any flow chart included herein. Further, (i) the operations are example operations, and may involve various additional steps not explicitly covered, and (ii) the temporal order of the operations may be varied. Where particular NVMe commands or structures are mentioned herein, it will be understood that other, similar command language or structures may be employed to generate a similar result.

Each of the terms "processing circuit" and "means for processing" is used herein to mean any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general-purpose hardware, such as a CPU, configured to execute instructions stored in a non-transitory storage medium. A processing circuit may be fabricated on a single printed circuit board (PCB) or distributed over several interconnected PCBs. A processing circuit may contain other processing circuits; for example, a processing circuit may include two processing circuits, an FPGA and a CPU, interconnected on a PCB.

As used herein, when a method (e.g., an adjustment) or a first quantity (e.g., a first variable) is referred to as being "based on" a second quantity (e.g., a second variable) it means that the second quantity is an input to the method or influences the first quantity, e.g., the second quantity may be an input (e.g., the only input, or one of several inputs) to a function that calculates the first quantity, or the first quantity may be equal to the second quantity, or the first quantity may be the same as (e.g., stored at the same location or locations in memory as) the second quantity. Similarly, if an action is referred to as being taken "in response to" the existence of a condition or circumstance, it means that the action is taken based at least in part on the existence of the condition or circumstance; other conditions or circumstances may or may not also influence the taking of the action.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of the inventive concept.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Any numerical range recited herein is intended to include all sub-ranges of the same numerical precision subsumed within the recited range. For example, a range of "1.0 to 10.0" or "between 1.0 and 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Similarly, a range described as "within 35% of 10" is intended to include all subranges between (and including) the recited minimum value of 6.5 (i.e., (1−35/100) times 10) and the recited maximum value of 13.5 (i.e., (1+35/100) times 10), that is, having a minimum value equal to or greater than 6.5 and a maximum value equal to or less than 13.5, such as, for example, 7.4 to 10.6. Any maximum numerical limitation recited herein is intended to include all lower numerical limitations subsumed therein and any minimum numerical limitation recited in this specification is intended to include all higher numerical limitations subsumed therein.

Although exemplary embodiments of a system and method for automatic deletion in a persistent storage device have been specifically described and illustrated herein, many modifications and variations will be apparent to those skilled in the art. Accordingly, it is to be understood that a system and method for automatic deletion in a persistent storage device constructed according to principles of this disclosure may be embodied other than as specifically described herein. The invention is also defined in the following claims, and equivalents thereof.

What is claimed is:

1. A method comprising:
   receiving a first command to write a first logical block of data, wherein the first command is associated with a first threshold value;
   storing the first logical block of data in a first physical location of a persistent storage device in response to the first command;
   receiving a second command to write a second logical block of data, wherein the second command is associated with a second threshold value;
   determining that the second threshold value matches the first threshold value;
   based on determining that the second threshold value matches the first threshold value, storing the second logical block of data in the first physical location;

receiving, by the persistent storage device, a third command to read one of the first logical block of data or the second logical block of data as read data;
determining that a number of read operations for the read data equals or exceeds a corresponding threshold value selected from the first threshold value or the second threshold value;
in response to determining that the number of read operations for the read data equals or exceeds the corresponding threshold value, marking, by the persistent storage device, the read data for identifying the read data as invalid; and
based on marking the first logical block of data, erasing, by the persistent storage device, from the first physical location, a physical block of data associated with the read data.

2. The method of claim 1, wherein the erasing of the physical block of data is based on a garbage collection operation.

3. The method of claim 1, wherein the first command includes the first threshold value.

4. The method of claim 3, wherein:
the persistent storage device comprises flash memory and a logical to physical address mapping table; and
the method further comprises storing the first threshold value in a row of the logical to physical address mapping table, the row corresponding to the first logical block of data.

5. The method of claim 3, further comprising:
receiving, by the persistent storage device, a fourth command to read the second logical block of data; and
in response to receiving the fourth command, incrementing a read counter in a row of a logical to physical address mapping table, the row corresponding to the second logical block of data.

6. The method of claim 1, further comprising:
determining, for a first physical block of the persistent storage device, that a set of remaining read times meets a criterion for few remaining read times, and
in response to determining that the set of remaining read times meets the criterion for few remaining read times, performing garbage collection in the first physical block.

7. The method of claim 1, further comprising:
receiving a query regarding support for an auto-delete feature, and
responding to the query with a response indicating that the auto-delete feature is supported.

8. The method of claim 1, further comprising:
receiving a query regarding auto-deleted logical blocks of data, and
responding to the query with a response including a list of logical blocks of data, the list including the first logical block of data.

9. A persistent storage device, comprising:
persistent storage media; and
a processing circuit,
the processing circuit being configured to:
receive a first command to write a first logical block of data, wherein the first command is associated with a first threshold value;
store the first logical block of data in a first physical location of the persistent storage media in response to the first command;
receive a second command to write a second logical block of data, wherein the second command is associated with a second threshold value;
determine that the second threshold value matches the first threshold value;
based on the processing circuit being configured to determine that the second threshold value matches the first threshold value, the processing circuit being configured to store the second logical block of data in the first physical location;
receive a third command to read one of the first logical block of data or the second logical block of data as read data;
determine that a number of read operations for the read data equals or exceeds a corresponding threshold value selected from the first threshold value or the second threshold value;
in response to determining that the number of read operations for the read data equals or exceeds the corresponding threshold value, mark the read data for identifying the read data as invalid; and
based on marking the read data, erase a physical block of data associated with the read data.

10. The persistent storage device of claim 9, wherein the processing circuit being configured to erase the first logical block of data is based on a garbage collection operation.

11. The persistent storage device of claim 9, wherein the first command includes the first threshold value.

12. The persistent storage device of claim 11, wherein:
the persistent storage device comprises flash memory and a logical to physical address mapping table; and
the processing circuit is further configured to store the first threshold value in a row of the logical to physical address mapping table, the row corresponding to the first logical block of data.

13. The persistent storage device of claim 11, wherein the processing circuit is further configured to:
receive a fourth command to read the second logical block of data; and
in response to receiving the fourth command, increment a read counter in a row of a logical to physical address mapping table, the row corresponding to the second logical block of data.

14. The persistent storage device of claim 13, wherein the processing circuit is further configured to:
receive a second write command, for the second logical block of data, the second write command including a second threshold value;
determine that the second threshold value and the first threshold value meet a criterion of similarity; and
in response to determining that the second threshold value and the first threshold value meet the criterion of similarity, store a portion of the second logical block of data and a portion of the first logical block of data in a first physical block.

15. The persistent storage device of claim 9, wherein the processing circuit is further configured to:
determine, for a first physical block of the persistent storage device, that a set of remaining read times meets a criterion for few remaining read times, and
in response to determining that the set of remaining read times meets the criterion for few remaining read times, perform garbage collection in the first physical block.

16. The persistent storage device of claim 9, wherein the processing circuit is further configured to:
receive a query regarding support for an auto-delete feature, and
respond to the query with a response indicating that the auto-delete feature is supported.

17. A persistent storage device, comprising:
persistent storage media; and
means for processing,
the means for processing being configured to:
  receive a first command to write a first logical block of data, wherein the first command is associated with a first threshold value;
  store the first logical block of data in a first physical location of the persistent storage media in response to the first command;
  receive a second command to write a second logical block of data, wherein the second command is associated with a second threshold value;
  determine that the second threshold value matches the first threshold value;
  based on the means for processing being configured to determine that the second threshold value matches the first threshold value, the means for processing being configured to store the second logical block of data in the first physical location;
  receive a third command to read one of the first logical block of data or the second logical block of data as read data;
  determine that a number of read operations for the read data equals or exceeds a corresponding threshold value selected from the first threshold value;
  in response to determining that the number of read operations for the read data equals or exceeds the corresponding threshold value, mark the read data for identifying the read data as invalid; and
  based on marking the read data, erase a physical block of data associated with the read data.

* * * * *